US006585444B1

(12) United States Patent
Podbutzky

(10) Patent No.: US 6,585,444 B1
(45) Date of Patent: Jul. 1, 2003

(54) QUICK-RELEASE COUPLER

(75) Inventor: William Podbutzky, Boyerstown, PA (US)

(73) Assignee: Neapco, Inc., Pottstown, PA (US)

( * ) Notice: Subject to any disclaimer, the term of this patent is extended or adjusted under 35 U.S.C. 154(b) by 0 days.

(21) Appl. No.: 09/992,383

(22) Filed: Nov. 6, 2001

Related U.S. Application Data

(60) Provisional application No. 60/279,587, filed on Mar. 29, 2001.

(51) Int. Cl.[7] .................................................. F16B 21/00

(52) U.S. Cl. ..................... 403/322.1; 403/324; 403/325

(58) Field of Search .............................. 403/321, 322.1, 403/322.2, 322.3, 322.4, 324, 325; 464/182, 901; 180/383

(56) References Cited

U.S. PATENT DOCUMENTS

| | | | | | |
|---|---|---|---|---|---|
| 1,566,849 | A | | 12/1925 | Fox | |
| 2,221,371 | A | | 12/1940 | De Bethune | |
| 2,448,278 | A | | 8/1948 | Ronning | |
| 2,926,034 | A | | 2/1960 | Weaver | |
| 3,070,390 | A | | 12/1962 | Schröter et al. | |
| 3,240,519 | A | | 3/1966 | Weasler | |
| 3,796,502 | A | | 3/1974 | Federspiel | |
| 4,125,337 | A | | 11/1978 | Recker | |
| 4,433,854 | A | | 2/1984 | Smith | |
| 4,433,934 | A | | 2/1984 | Cleveland | |
| 4,480,497 | A | | 11/1984 | Locher | |
| 4,508,468 | A | | 4/1985 | Irwin | |
| 4,692,049 | A | | 9/1987 | Engle | |
| 4,760,984 | A | | 8/1988 | Hennessey | |
| 4,892,430 | A | | 1/1990 | Liska et al. | |
| 5,390,571 | A | * | 2/1995 | Fox et al. | 403/325 X |
| 5,501,542 | A | | 3/1996 | Hall, Sr. | |
| 5,556,224 | A | * | 9/1996 | Niskanen | 403/324 X |
| 5,586,472 | A | * | 12/1996 | Lin | 403/325 X |
| 6,139,214 | A | * | 10/2000 | Zirps et al. | 403/325 |
| 6,394,687 | B1 | * | 5/2002 | Lee | 403/322.1 X |
| 2002/0164205 | A1 | * | 11/2002 | Kresge | 403/322.1 |

* cited by examiner

*Primary Examiner*—Gregory J. Binda
*Assistant Examiner*—Ryan Flandro
(74) *Attorney, Agent, or Firm*—Woodcock Washburn LLP

(57) ABSTRACT

A presently-preferred embodiment of a quick-release coupler comprises a housing having a first interior surface defining a center cavity and a second interior surface defining a through hole intersecting the center cavity. The coupler also comprises a locking member at least partially disposed in the center cavity and having a first and an opposing second inwardly facing surface partially defining a central passage in the locking member, and a projection extending partially along a length of the first surface. The locking member is movable between a first position wherein the central passage is adapted to removably receive an end portion of a torque-transmitting shaft, and a second position wherein the projection is adapted to engage a recessed portion of the torque-transmitting shaft and thereby inhibit removal of the end portion from the central passage.

23 Claims, 6 Drawing Sheets

QUICK-RELEASE COUPLER

This application claims priority under 35 U.S.C. §119(e) to U.S. Provisional Patent Application Serial No. 60/279,587, which was filed on Mar. 29, 2001 and is hereby incorporated by reference in its entirety.

FIELD OF THE INVENTION

The present invention relates to mechanical couplers. More particularly, the invention relates to a quick-release coupler for mechanically coupling a driving shaft to a driven shaft.

BACKGROUND OF THE INVENTION

Torque is commonly transmitted between mechanical components by way of a driving shaft that imparts rotational movement to a driven shaft. The driving shaft and the driven shaft are typically joined using some form of mechanical coupler. Such couplers are often used in applications that require frequent coupling and decoupling of the driving shaft and the driven shaft. For example, a typical farm tractor may be used in conjunction with several different types of farming implements in one day, e.g., a plow, spreader, planter, etc. Couplers that permit the driving and driven shafts of these components to be coupled and decoupled quickly, and with minimal effort are therefore highly desirable.

So-called "quick-release" couplers have been developed to facilitate the coupling and decoupling of driven and driving shafts on an expedited basis. Such couplers, however, often require multiple steps in the coupling and decoupling process, and necessitate the use of external tooling. Some quick-release couplers also require a time-consuming alignment of the driving and driven shafts.

Conventional quick-release couplers may incorporate twist collars to secure the driving and driven shafts. Such couplers, however, are usually large, complex and expensive in relation to other types of couplers. Other types of conventional quick-release couplers may rely on the engagement of a ball and a detent to secure the driving and driven shafts. These types of couplers, in general, do not provide a positive visual indication that the shafts have been properly coupled.

In light of the above discussion, it is evident that an ongoing need exists for a simple, compact, and inexpensive quick-release coupler that can be used to couple a driving and a driven shaft with minimal effort, that minimizes the possibility for errors during the coupling process, and that provides a positive visual indication that the shafts have been properly coupled.

SUMMARY OF THE INVENTION

A presently-preferred embodiment of a coupler for releasably coupling a first shaft and a second shaft comprises a housing having a first interior surface defining a center cavity and a second interior surface defining a through hole intersecting the center cavity. The coupler also comprises a locking member at least partially disposed in the center cavity. The locking member comprises a first and an opposing second inwardly-facing surface partially defining a central passage in the locking member, and a projection extending partially along a length of the first inwardly-facing surface.

The locking member is movable between a first position wherein the projection is substantially misaligned with the through hole and the central passage is adapted to removably receive an end portion of the first shaft, and a second position wherein the projection is substantially aligned with the through hole and the projection is adapted to engage a recessed portion of the first shaft and thereby inhibit removal of the end portion from the central passage.

A presently-preferred embodiment of a quick-release coupler comprises a housing having a first interior surface defining a center cavity and a second interior surface defining a through hole intersecting the center cavity. The quick-release coupler also comprises a locking member at least partially disposed in the center cavity. The locking member comprises a first and an opposing second inwardly facing surface partially defining a central passage in the locking member, and a projection extending partially along a length of the first surface. The locking member is movable between a first position wherein the central passage is adapted to removably receive an end portion of a torque-transmitting shaft, and a second position wherein the projection is adapted to engage a recessed portion of the torque-transmitting shaft and thereby inhibit removal of the end portion from the central passage.

Another presently-preferred embodiment of a coupler for releasably coupling a first shaft and a second shaft comprises a housing comprising a central portion having an interior surface defining a center cavity having an upper portion, a middle portion, and an lower portion. The housing also comprises a flange portion extending from the central portion and having an interior surface defining a through hole. The through hole intersects the middle portion of the center cavity, and is adapted to receive the first shaft.

The coupler further comprises a locking member at least partially disposed in the center cavity. The locking member comprises a first and an opposing second inwardly-facing surface partially defining a central passage within the locking member, and a projection extending along the first inwardly-facing surface. The locking member is movable between a first position wherein the projection is located in the lower portion of the center cavity and the central passage is adapted to removably receive the first shaft, and a second position wherein the projection is located in the middle portion of the center cavity and the projection is adapted to engage a recessed portion of the first shaft and thereby inhibit relative movement between the first shaft and the housing.

Another presently-preferred embodiment of a coupler for releasably coupling a first shaft and a second shaft comprises a housing comprising a central portion having an interior surface defining a center cavity, and a flange portion extending from the central portion and having an interior surface defining a through hole adapted to receive the first shaft.

The coupler further comprises a locking member at least partially disposed in the center cavity and comprising a first inwardly-facing surface having an upper portion and a lower portion, and an opposing second inwardly-facing surface having an upper portion and a lower portion. The locking member also comprises a first projection extending along not more than the lower portion of the first surface, and a second projection extending along not more than the lower portion of the second surface. The locking member is movablebetween a first position wherein an extended centerline of the through hole is located between the upper portions of the first and the second surfaces, and a second position wherein the extended centerline of the through hole is located between the first and the second projections.

Another presently-preferred embodiment of a coupler for releasably coupling a first shaft and a second shaft comprises a housing comprising a first interior surfacedefining a center cavity, and a second interior surface defining a through hole adapted to receive the first shaft. The coupler further comprises a locking member at least partially disposed in the center cavity and comprising a first and an opposing second inwardly-facing surface partially defining a central passage having an upper and a lower portion.

The locking member also comprises a projection extending along not more than a portion of the first inwardly-facing surface and being located in only the lower portion of the central passage. The locking member is movable between a first position wherein the upper portion of the central passage is substantially aligned with the through hole and is adapted to removably receive an end portion of the first shaft, and a second position wherein the lower portion of the central passage is substantially aligned with the through hole and the projection is adapted to engage a recessed portion of the first shaft and thereby inhibit relative movement between the first shaft and the housing.

BRIEF DESCRIPTION OF THE DRAWINGS

For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

A presently-preferred embodiment of the invention provides a quick-release coupler for removably coupling a first and a second shaft. A presently-preferred quick-release coupler 10 is depicted in FIGS. 1–10. The figures are referenced to a common coordinate system 8 depicted therein. The quick-release coupler 10 is utilized to releasably couple an input shaft 14 of a tractor to cross shaft 12 of a combine spreader (the input shaft 14 and the cross shaft 12 function as driving and driven shafts, respectively, in this particular arrangement). This particular embodiment is described for illustrative purposes only. The invention can be used in virtually any type of application in which a driving shaft is releasably coupled to a driven shaft.

Figure 1A:
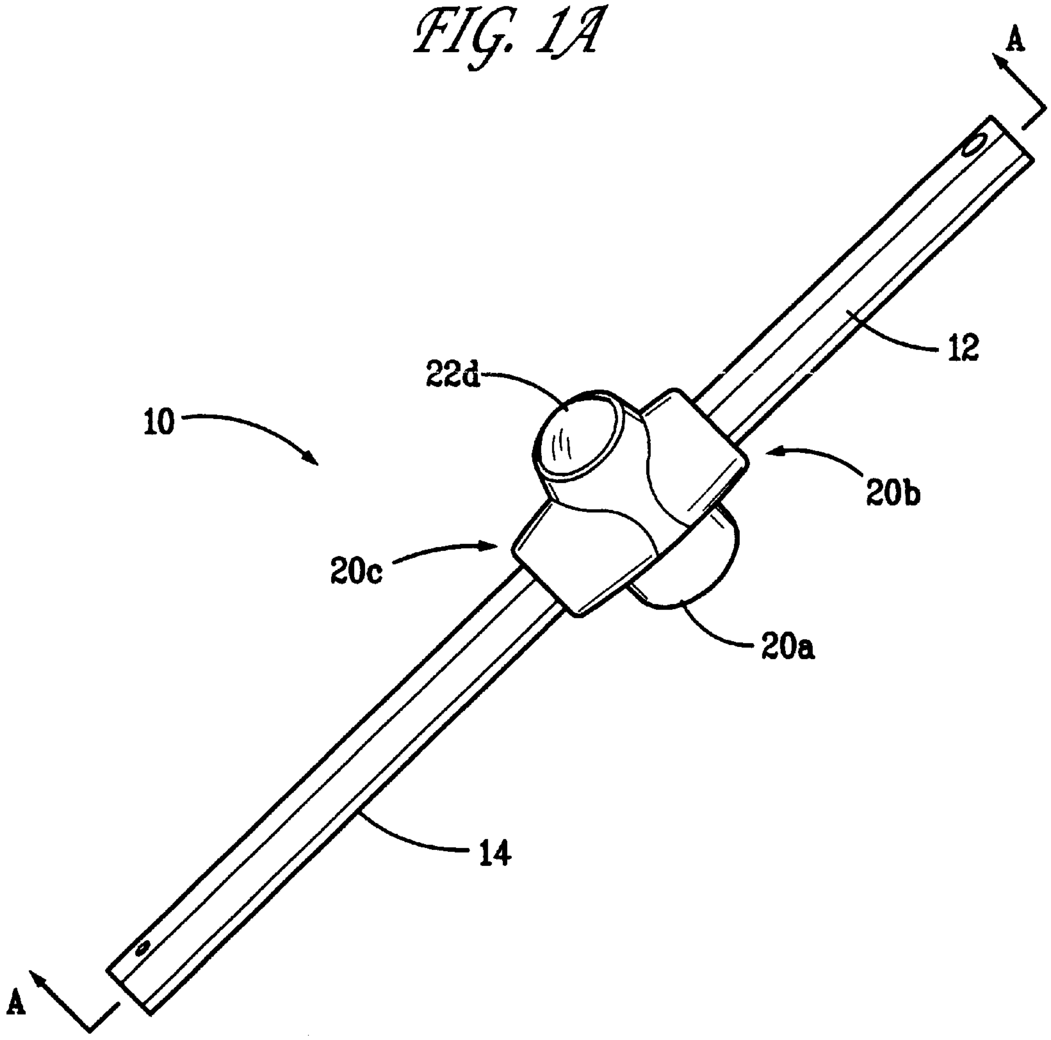
FIG. 1A is a top perspective view of presently-preferred coupler having an input shaft and a cross shaft coupled thereto, with a locking member of the coupler in an upper position.
Figure 1B:
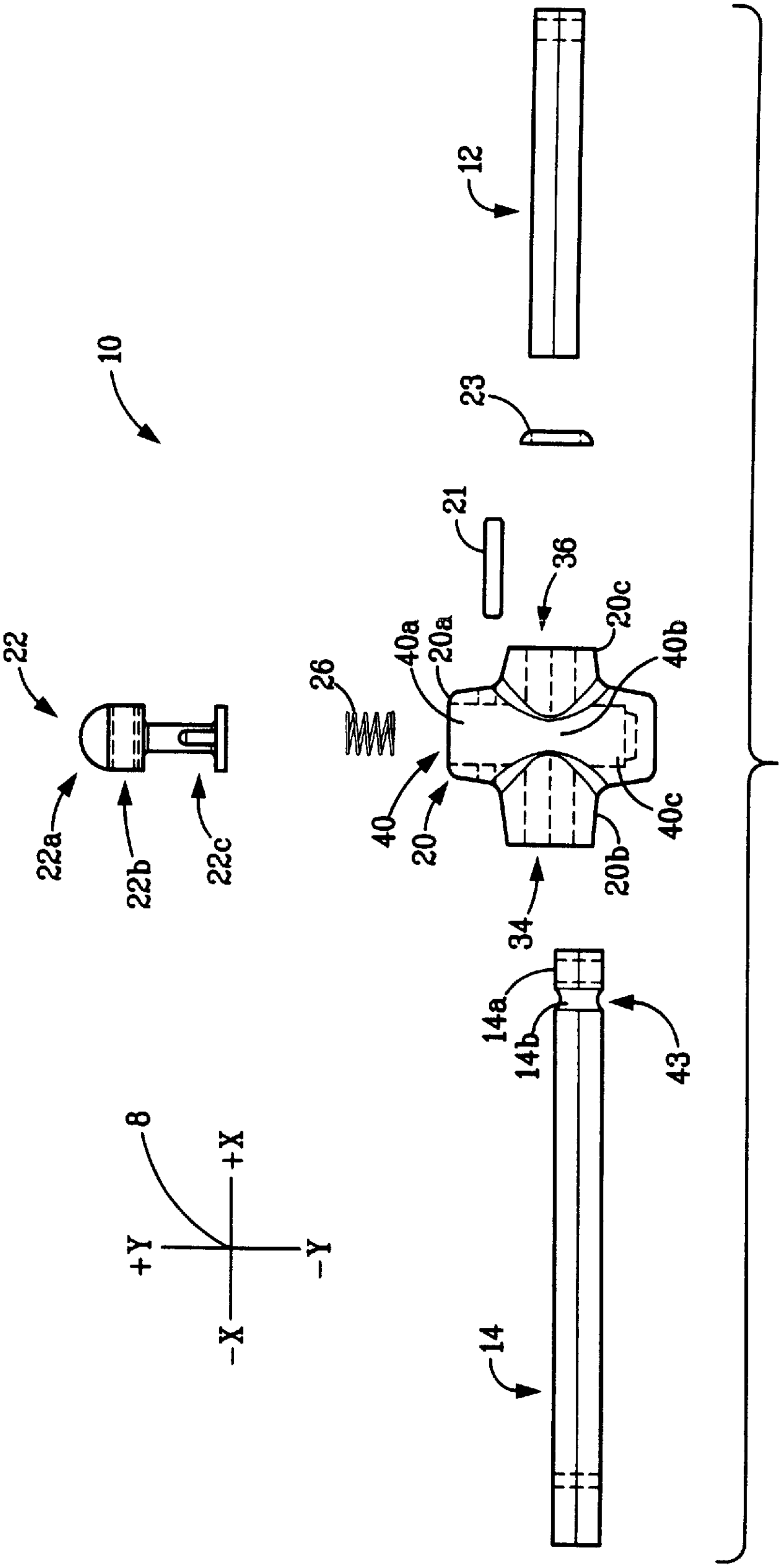
FIG. 1B is an exploded view of the coupler, the input shaft, and the cross shaft shown in FIG. 1A.
Figure 2A:
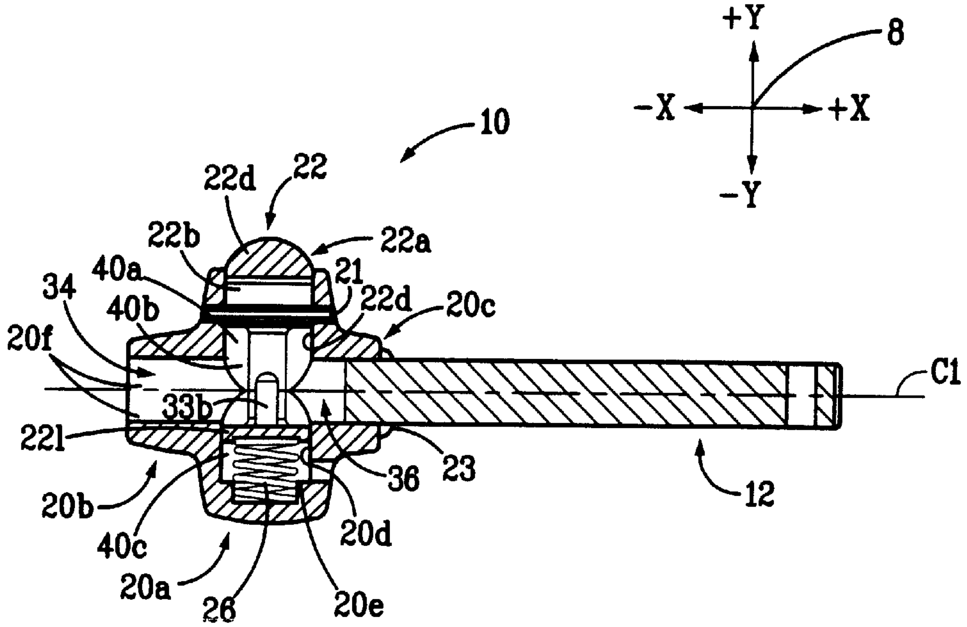
FIG. 2A is a cross-sectional side view of the coupler and the cross shaft shown in FIG. 1 taken along the line "A—A" of FIG. 1, with the locking member in the upper position.
Figure 2B:
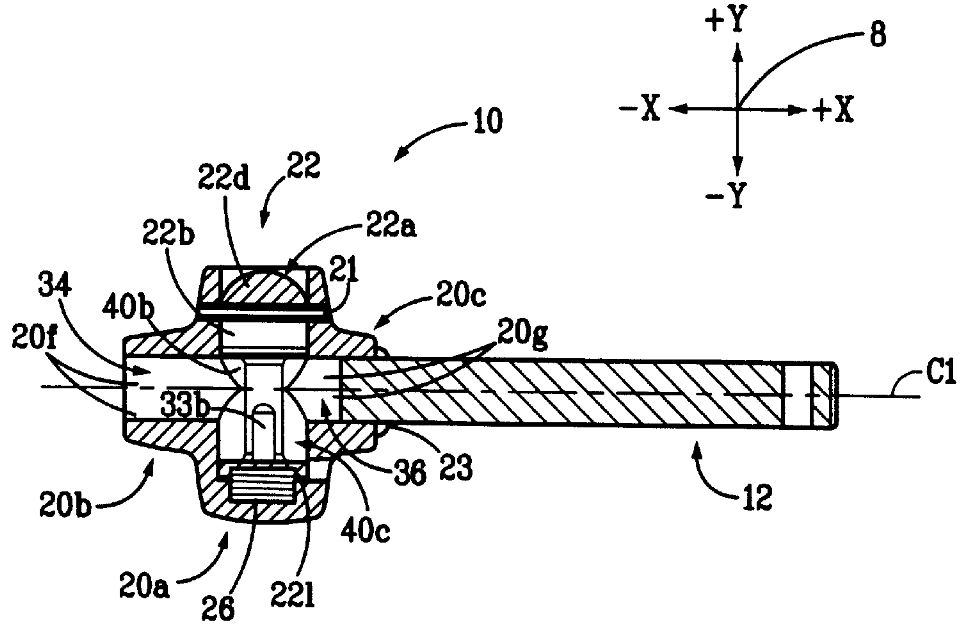
FIG. 2B is a cross-sectional side view of the coupler and the cross shaft shown in FIGS. 1 and 2A taken along the line "A—A" of FIG. 1, with the locking member in a lower position.
Figure 3A:
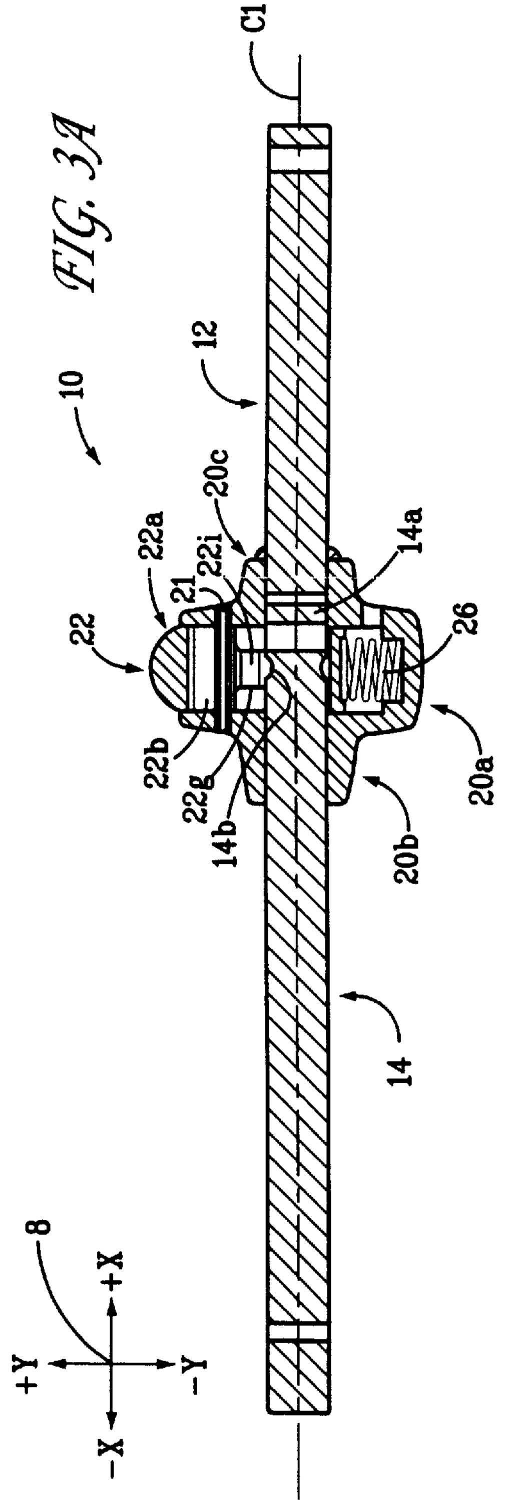
FIG. 3A is a cross-sectional side view of the coupler, the input shaft, and the cross shaft shown in FIGS. 1–2B taken along the line "A—A" of FIG. 1, with the locking member in the upper position and engaging the cross shaft.
Figure 3B:
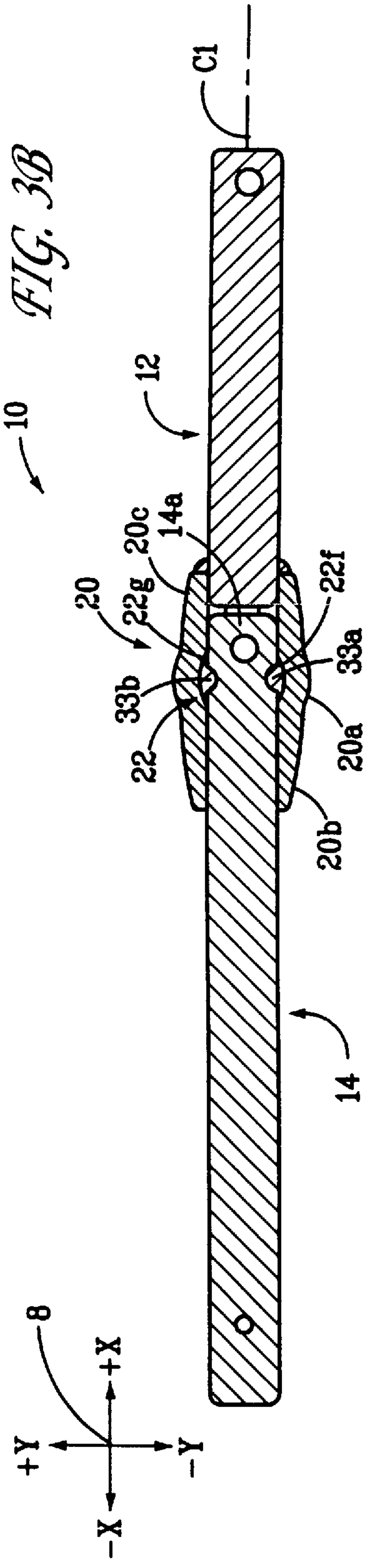
FIG. 3B is a top cross-sectional view of the coupler, the input shaft, and the cross shaft shown in FIGS. 13A, with the locking member in the upper position and engaging the cross shaft, from a perspective rotated ninety degrees from the perspective of FIG. 3A.
Figure 4:
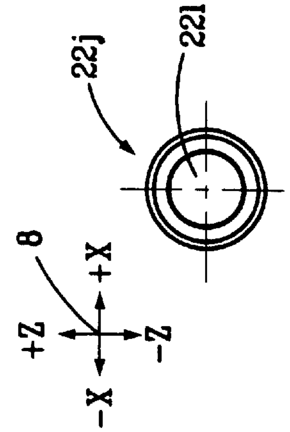
FIG. 4 is a bottom view of the locking member of the coupler shown in FIGS. 1–3B.
Figure 5:
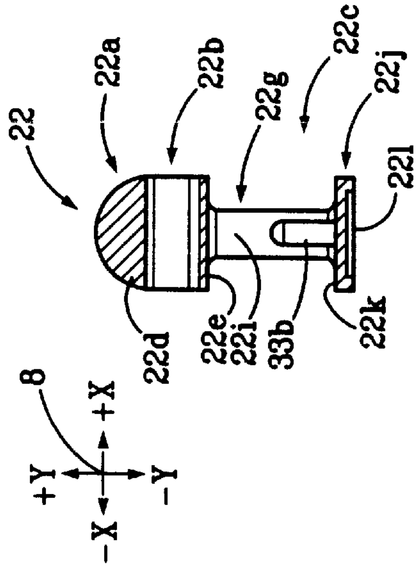
FIG. 5 is cross-sectional side view of the locking member shown in FIG. 4, taken along the line "5—5" of FIG. 8.
Figure 6:
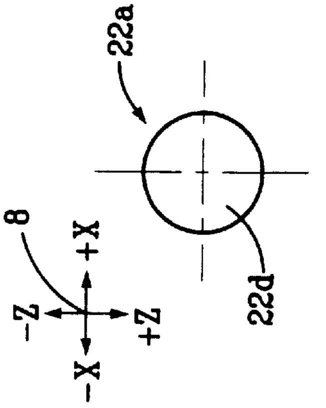
FIG. 6 is top view of the locking member shown in FIGS. 4 and 5.
Figure 7:
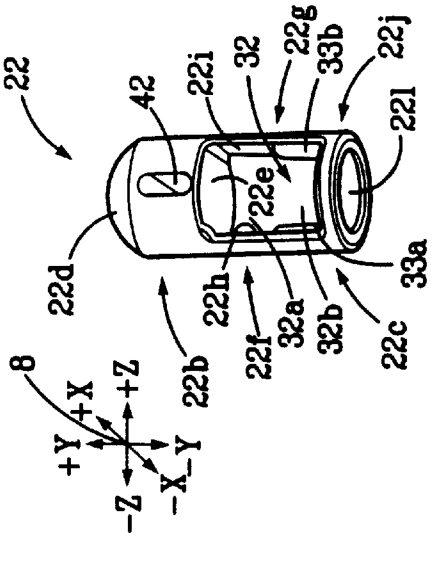
FIG. 7 is bottom perspective view of the locking member shown in FIGS. 4–6.
Figure 8:
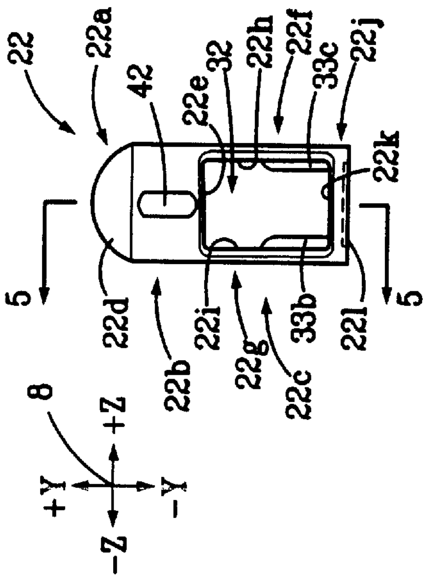
FIG. 8 is side view of the locking member shown in FIGS. 4–7, from a perspective rotated ninety degrees from the perspective of FIG. 5.
Figure 9:
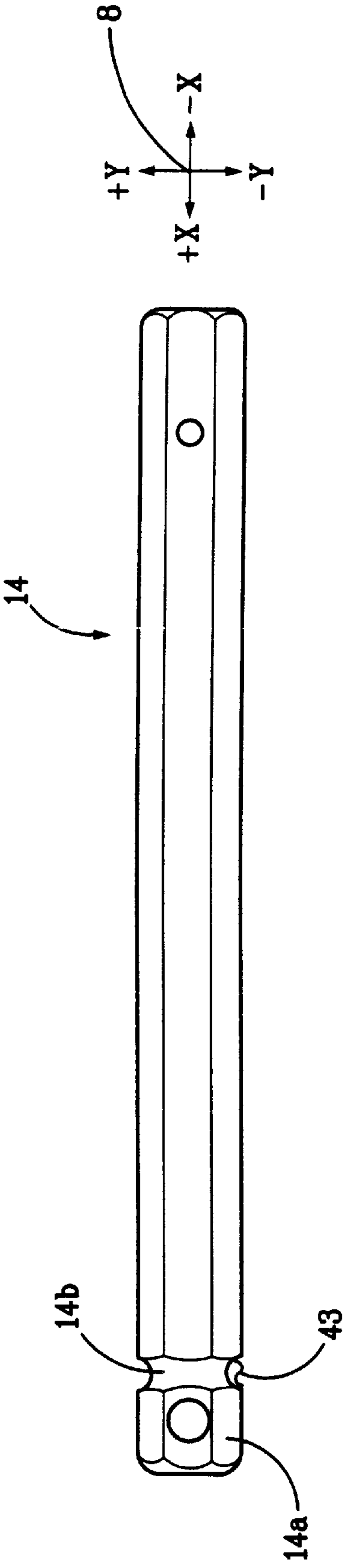
FIG. 9 is an axial view of the input shaft shown in FIGS. 1A, 1B, 3A, and 3B.
Figure 10:
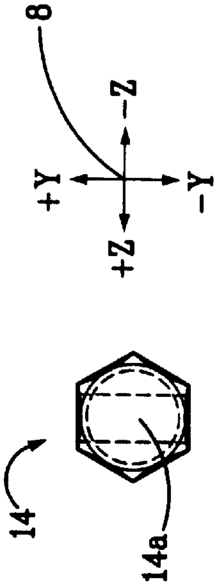
FIG. 10 is a side view of the input shaft shown in FIGS. 1A, 1B, 3A, 3B, and 9, from a perspective rotated ninety degrees from the perspective of FIG. 9.

The coupler 10 comprises a housing 20 having a central portion 20*a* and a first flange portion 20*b* extending from the central portion 20*a* (see FIGS. 1–3). The housing 20 also includes a second flange portion 20*c* extending from an opposite side of the central portion 20*a* as the first flange portion 20*b*. The housing 20 includes a first interior surface 20*d* that defines a substantially cylindrical cavity 40 within the main portion 20*a*. The cavity 40 includes an upper portion 40*a*, a middle portion 40*b*, and a lower portion 40*c*. An upper end of the cavity 40 is open, i.e., unrestricted, and a lower end of the cavity 40 is defined by a second interior surface 20*e* of the housing 20. It should be noted that directional terms appearing throughout the specification and claims, e.g. "upper," "lower," etc., are used with reference to the component orientations depicted in FIGS. 1B–3B. These terms are used for illustrative purposes only, and are not intended to limit the scope of the appended claims.

The housing 20 includes a third interior surface 20*f* that defines a first through hole 34. The first though hole 34 extends through the first flange portion 20*b* and intersects the center cavity 40. The first through hole 34 is adapted to receive the input shaft 14 (the input shaft 14 is shown in detail in FIGS. 9 and 10). The input shaft 14 and the first through hole 34 of the exemplary embodiment each have a substantially hexagonal cross-section. The invention, however, can be used in conjunction with driving and driven shafts having virtually any type of cross-section, including splined shafts and shafts having substantially square or rectangular cross-sections. Details relating to the coupling of the input shaft 14 and the housing 20 are presented below.

The housing 20 includes a fourth interior surface 20*g* that defines a second through hole 36. The second though hole 36 extends through the second flange portion 20*c* and intersects the center cavity 40. The second through hole 36 is adapted to receive the cross shaft 12. The cross shaft 132 is preferably fixed to the housing 20 by a retaining ring 23 secured in place by welding. The cross shaft 12 and the second through hole 36 each have a substantially hexagonal cross-section.

The quick-release coupler 10 further comprises a locking member 22. The locking member 22 is shown in detail in FIGS. 4–8. The locking member 22 is positioned at least partially within the cavity 40 of the housing 20, and is capable of translating between an upper position (FIGS. 2A and 3) and a lower position (FIG. 2B). The locking member 22 includes an upper portion 22*a*, intermediate portion 22*b*, and a lower portion 22*c*. The upper portion 22*a* preferably has a rounded upper surface 22*d*. In other words, the upper portion 22*a* preferably has a substantially hemispherical shape. The upper portion 22*a* extends upwardly from the central portion 20*a* of the housing 20 when the locking member 22 is in its upper position, as shown in FIGS. 1, 2A, and 3A. The intermediate portion 22*b* is substantially cylindrical, and has a vertically-extending slot 42 defined therein. The intermediate portion 22*b* includes a lower surface 22*e*.

The lower portion 22c comprises a first side member 22f and a second side member 22g. The first side member has an inner surface 22h, and the second side member has an inner surface 22i that opposes the inner surface 22h. The lower portion 22c also comprises a bottom member 22j having an upper surface 22k and a lower surface 221.

The surfaces 22e, 22h, 22i, and 22k define an internal passage 32 in the locking member 22. The internal passage 32 has an upper portion 32a and a lower portion 32b (see FIG. 7).

The locking member 22 further comprises a first projection 33a and a second projection 33b. The projection 33a projects inwardly from the inner surface 22h of the side member 22f. The projection 33b projects inwardly from the inner surface 22i of the side member 22g. The projections 33a, 33b each extend upwardly from the upper surface 22k of the bottom member 22j. The projection 33a extends over no more than a portion of the inner surface 22h, and the projection 33b extends over no more than a portion of the inner surface 22i so that the projections 33a, 33b are located exclusively within the lower portion 32b of the central passage 32.

The upper portion 32a of the central passage 32 substantially aligns with the first through hole 34 in the housing 20 when the locking member 22 is in its lower position, as shown in FIG. 2B. In other words, an extended centerline C1 of the through hole 34 extends through the upper portion 32a of the central passage 32 when the locking member 22 is in its lower position.

The lower portion 32b of the central passage 32 and the projections 33a, 33b are substantially aligned with the through hole 34 when the locking member 22 is in its upper position, as shown in FIGS. 2A and 3A. Hence, the extended centerline C1 of the through hole 34 is positioned between the projections 33a, 33b when the locking member 22 is in its upper position. The projections 33a, 33b, when positioned in this manner, prevent the end portion 14a of the input shaft 14 from being inserted into the central passage 32 via the through hole 34.

The quick-release coupler 10 further comprises a spring 26. The spring 26 is positioned within the cavity 40, between second interior surface 20e of the housing 20 and the lower surface 221 of the locking member 22 (see FIGS. 2A–3A). The spring 26 biases the locking member 22 toward its upper position. The quick-release coupler 10 also comprises a pin member 21. The pin member 21 extends through the slot 42 in the locking member 22. Opposing ends of the pin member 21 are fixed to the central portion 20a of the housing 20 by, for example, pressing the ends into bores defined in the central portion 20a. The pin member 21 restrains the locking member 22 from rotating in relation to the housing 20, while permitting the locking member 22 to translate linearly between its upper and lower positions. The pin member 21 also functions as an upper stop for the locking member 22.

Operational details concerning the quick-release coupler 10 are as follows. The, quick-release coupler 10 is adapted for use with a shaft such as the input shaft 14 depicted in FIGS. 9 and 10, as noted previously. The input shaft 14 includes an end portion 14a having a recessed portion 14b that defines a circumferentially-extending recess 43 (see FIG. 9).

The input shaft 14 is coupled to the quick-release coupler 10 (and the cross shaft 12) by inserting the end portion 14a of the input shaft 14 into the first through hole 34 of the housing 20 while the locking member 22 is in its lower position (see FIG. 2B). The locking member 22 is moved to its lower position by the application of downward force to the upper surface 22d of the locking member 22 (the spring rate of the spring 26 is preferably chosen so that the locking member can be moved manually). Movement of the locking member 22 to its lower position causes the upper portion 32a of the central passage 32 to substantially align with the through hole 34. In other words, moving the locking member 22 to its lower position misaligns the projections 33a, 33b and the through hole 34, and thereby facilitates the continued insertion of the end portion 14a of the cross shaft 12 into the through hole 34.

Continued insertion of the end portion 14a into the through hole 34 causes the end portion 14a to enter the upper portion 32a of the central passage 32. The continued insertion of the end portion 14a eventually causes the recess 43 defined by the input shaft 14 to substantially align with the projections 33a, 33b. Releasing the locking member 22 at this point causes the locking member 22 to translate into its upper position in response to the bias of the spring 26. The upward translation of the locking member 22 also causes the projections 33a, 33b to become at least partially disposed within the recess 43, as shown in FIGS. 3A and 3B. The resulting engagement of the projections 33a, 33b and the recessed portion 14b of the cross shaft 12 restrains the input shaft 14 from axial (x-direction) movement in relation to the locking member 22 and the housing 10, and thereby couples the input shaft 14 and the cross shaft 12. (Rotation of the input shaft 14 in relation to the housing 20 is inhibited by the engagement of the hexagonally-shaped input shaft 14 and the matching surface 20f of the housing 20.)

The input shaft 14 and the cross shaft 12 are decoupled by applying downward force on the locking member 22 to move the locking member 22 to its lower position. This action moves the projections 33a, 33b away from the recess 43, thereby allowing the end portion 14a of the input shaft 14 to be withdrawn from the central passage 32 and the through hole 34.

The quick-release coupler 10 thus permits the input shaft 14 and the cross shaft 12 to be coupled and decoupled with one single action, i.e., depressing the locking member 22. Furthermore, the quick-release coupler 10 has a minimal parts count (three), and can be manufactured without the need for complex machining operations. In addition, the upper portion 22a of the locking member 22 protrudes from the housing 20 when the projections 33a, 33b have engaged the recessed portion 14b of the input shaft 14, thereby providing a positive visual indication that the input shaft 14 has been securely coupled to the cross shaft 12. This feature, combined with the simple "push-button" operation of the quick-release coupler 10, minimizes any possibility for errors in the coupling and decoupling processes.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention. For example, although the presently-preferred embodiment described herein includes two of the projections 33a, 33b, alternative embodiments may include only one such projection. Also, the shapes of the housing 20 and the locking member 22 are application dependent, i.e., the geometry of the housing 20 and the locking member 22 will vary with the geometry of the driving and driven shafts.

What is claimed is:

1. A coupler for releasably coupling a first shaft and a second shaft, comprising:

a housing having a first interior surface defining a center cavity and a second interior surface defining a through hole intersecting the center cavity; and a locking member at least partially disposed in the center cavity and comprising:

a first and an opposing second inwardly-facing surface partially defining a central passage in the locking member;

a projection extending partially along a length of the first inwardly-facing surface; an upper portion;

an intermediate portion having a lower surface that partially defines the central passage; and a lower portion, the lower portion comprising a first side member adjoining the intermediate portion and including the first inwardly-facing surface, a second side member adjoining the intermediate portion and including the second inwardly-facing surface, and a bottom member adjoining the first and the second side members and having an upper surface that partially defines the central passage, wherein the locking member is movable between a first position wherein the projection is substantially misaligned with the through hole and the central passage can removably receive an end portion of the first shaft, and a second position wherein the projection is substantially aligned with the through hole and the projection can engage a recessed portion of the first shaft and thereby inhibit removal of the end portion from the central passage.

2. The coupler of claim 1, further comprising a second projection extending partially along a length of the second inwardly-facing surface.

3. The coupler of claim 1, further comprising a spring disposed within the center cavity and biasing the locking member toward the second position.

4. The coupler of claim 1, wherein the housing has a third interior surface defining a second through hole intersecting the center cavity and being adapted to receive the second shaft.

5. The coupler of claim 1, wherein the locking member comprises an upper portion having a substantially hemispherical shape.

6. The coupler of claim 1, wherein the through hole has a substantially hexagonal shape.

7. A coupler for releasably coupling a first shaft and a second shaft, comprising:

a housing having a first interior surface defining a center cavity and a second interior surface defining a through hole intersecting the center cavity, a locking member at least partially disposed in the center cavity and comprising a first and an opposing second inwardly-facing surface partially defining a central passage in the locking member, and a projection extending partially along a length of the first inwardly-facing surface, the locking member being movable between a first position wherein the projection is substantially misaligned with the through hole and the central passage can removably receive an end portion of the first shaft, and a second position wherein the projection is substantially aligned with the through hole and the projection can engage a recessed portion of the first shaft and thereby inhibit removal of the end portion from the central passage; and a pin member extending through a slot defined in the locking member and being fixed to the housing.

8. A quick-release coupler, comprising:

a housing having a first interior surface defining a center cavity and a second interior surface defining a through hole intersecting the center cavity, and a locking member at least partially disposed in the center cavity and comprising:

a first and an opposing second inwardly facing surface partially defining a central passage in the locking member;

a projection extending partially along a length of the first surface;

an upper portion having a substantially hemispherical shape;

an intermediate portion having a lower surface that partially defines the central passage and having a slot defined therein for receiving a pin member, and a lower portion, the lower portion comprising a first side member adjoining the intermediate portion and including the first inwardly-facing surface, a second side member adjoining the intermediate portion and including the second inwardly-facing surface, and a bottom member adjoining the first and the second side members and having an upper surface that partially defines the central passage, wherein the locking member is movable between a first position wherein the central passage can removably receive an end portion of a torque-transmitting shaft, and a second position wherein the projection can engage a recessed portion of the torque-transmitting shaft and thereby inhibit removal of the end portion from the central passage.

9. The quick-release coupler of claim 8, further comprising a second projection extending partially along a length of the second inwardly-facing surface.

10. The quick-release coupler of claim 8, further comprising a spring disposed within the center cavity and biasing the locking member toward the second position.

11. The quick-release coupler of claim 8, wherein the housing has a third interior surface defining a second through hole intersecting the center cavity and being adapted to receive a second torque-transmitting shaft.

12. A coupler for releasably coupling a first and a second shaft, comprising:

a housing comprising a central portion having an interior surface defining a center cavity having (i) an upper portion, (ii) a middle portion, and (iii) a lower portion, and a flange portion extending from the central portion and having an interior surface defining a through hole for receiving the first shaft, the through hole intersecting the middle portion of the center cavity; and a locking member at least partially disposed in the center cavity and comprising:

a first and an opposing second inwardly-facing surface partially defining a central passage within the locking member;

a projection extending along the first inwardly-facing surface;

an upper portion having a substantially hemispherical shape;

an intermediate portion having a lower surface that partially defines the central passage and having a slot defined therein for receiving a pin member; and a lower portion, the lower portion comprising a first side member adjoining the intermediate portion and including the first inwardly-facing surface, a second side member adjoining the intermediate portion and including the second inwardly-facing surface, and a bottom member adjoining the first and the second side members and having an upper surface that partially defines the central passage, wherein the locking member is movable between a first position wherein the projection is located in the lower portion of the center cavity and the central passage can removably receive the first shaft, and a second position wherein the projection is located in the middle portion of the center cavity and the projection can engage a recessed portion of the first shaft and thereby inhibit relative movement between the first shaft and the housing.

13. The coupler of claim 12, further comprising a second projection extending partially along a length of the second inwardly-facing surface.

14. The coupler of claim 12, further comprising a spring disposed within the center cavity and biasing the locking member toward the second position.

15. The coupler of claim 12, wherein the housing comprises a second flange portion extending from the central portion and having an interior surface defining a second through hole, the second through hole intersecting the middle portion of the center cavity and being adapted to receive the second shaft.

16. The coupler of claim 12, wherein the through hole has a substantially hexagonal shape.

17. A coupler for releasably coupling a first and a second shaft, comprising:

- a housing comprising a central portion having an interior surface defining a center cavity, and a flange portion extending from the central portion and having an interior surface defining a through hole for receiving the first shaft; and
- a locking member at least partially disposed in the center cavity and comprising:
  - a first inwardly-facing surface having an upper portion and a lower portion;
  - an opposing second inwardly-facing surface having an upper portion and a lower portion;
  - a first projection extending along not more than the lower portion of the first surface;
  - a second projection extending along not more than the lower portion of the second surface;
  - an upper portion having a substantially rounded upper surface;
  - an intermediate portion having a lower surface that partially defines the central passage and having a slot defined therein for receiving a pin member; and
  - a lower portion, the lower portion comprising a first side member adjoining the intermediate portion and including the first inwardly-facing surface, a second side member adjoining the intermediate portion and including the second inwardly-facing surface, and a bottom member adjoining the first and the second side members and having an upper surface that partially defines the central passage, wherein the locking member is movable between a first position wherein an extended centerline of the through hole is located between the upper portions of the first and the second surfaces, and a second position wherein the extended centerline of the through hole is located between the first and the second projections.

18. The coupler of claim 17, wherein the housing comprises a second flange portion extending from the central portion and having an interior surface defining a second through hole, the second through hole intersecting the middle portion of the center cavity and being adapted to receive the second shaft.

19. The coupler of claim 17, wherein the through hole has a substantially hexagonal shape.

20. A coupler for releasably coupling a first and a second shaft, comprising:

- a housing comprising a first interior surface defining a center cavity, and a second interior surface defining a through hole adapted to receive the first shaft; and
- a locking member at least partially disposed in the center cavity and comprising a first and an opposing second inwardly-facing surface partially defining a central passage having an upper and a lower portion, the locking member further comprising a projection extending along not more than a portion of the first inwardly-facing surface and being located in only the lower portion of the central passage, the locking member being movable between a first position wherein the upper portion of the central passage is substantially aligned with the through hole and is adapted to removably receive an end portion of the first shaft, and a second position wherein the lower portion of the central passage is substantially aligned with the through hole and the projection is adapted to engage a recessed portion of the first shaft and thereby inhibit relative movement between the first shaft and the housing.

21. The coupler of claim 20, wherein the locking member further comprises (i) a second projection extending along not more than the portion of the second inwardly-facing surface and being located in only the lower portion of the central passage (ii) an upper portion of the locking member, the upper portion of the locking member having a substantially rounded upper surface, (iii) an intermediate portion having a lower surface that partially defines the central passage and having a slot defined therein for receiving a pin member, and (iv) a lower portion of the locking member, the lower portion of the locking member comprising a first side member adjoining the intermediate portion and including the first inwardly-facing surface, a second side member adjoining the intermediate portion and including the second inwardly-facing surface, and a bottom member adjoining the first and the second side members and having an upper surface that partially defines the central passage.

22. The coupler of claim 20, wherein the housing has a third interior surface defining a second through hole intersecting the center cavity and being adapted to receive the second shaft.

23. The coupler of claim 20, wherein the through hole has a substantially hexagonal shape.

* * * * *

UNITED STATES PATENT AND TRADEMARK OFFICE
CERTIFICATE OF CORRECTION

PATENT NO. : 6,585,444 B1
DATED : July 1, 2003
INVENTOR(S) : William Podbutzky

It is certified that error appears in the above-identified patent and that said Letters Patent is hereby corrected as shown below:

Column 2,
Line 61, delete "movablebetween" and insert therefor -- movable between --.

Column 3,
Line 1, delete "surfacedefining" and insert therefor -- surface defining --.
Line 42, delete "13A" and insert therefor -- 1-3A --.

Column 7,
Line 10, after "surface;" please begin a new indented paragraph.

Signed and Sealed this

First Day of June, 2004

JON W. DUDAS
*Acting Director of the United States Patent and Trademark Office*

UNITED STATES PATENT AND TRADEMARK OFFICE

CERTIFICATE OF CORRECTION

PATENT NO. : 6,585,444 B1
APPLICATION NO. : 09/992383
DATED : July 1, 2003
INVENTOR(S) : William Podbutzky It is certified that error appears in the above-identified patent and that said Letters Patent is hereby corrected as shown below:

Column 2:
Line 61, delete “movablebetween” and insert therefor -- movable between --.

Column 3:
Line 1, delete “surfacedefining” and insert therefore -- surface defining --.
Line 42, delete “13A” and insert therefor --1-3A--.

Column 7:
Line 10, Claim 1, after “surface;” please begin a new indented paragraph.

Signed and Sealed this

Seventeenth Day of July, 2007

JON W. DUDAS
*Director of the United States Patent and Trademark Office*